…

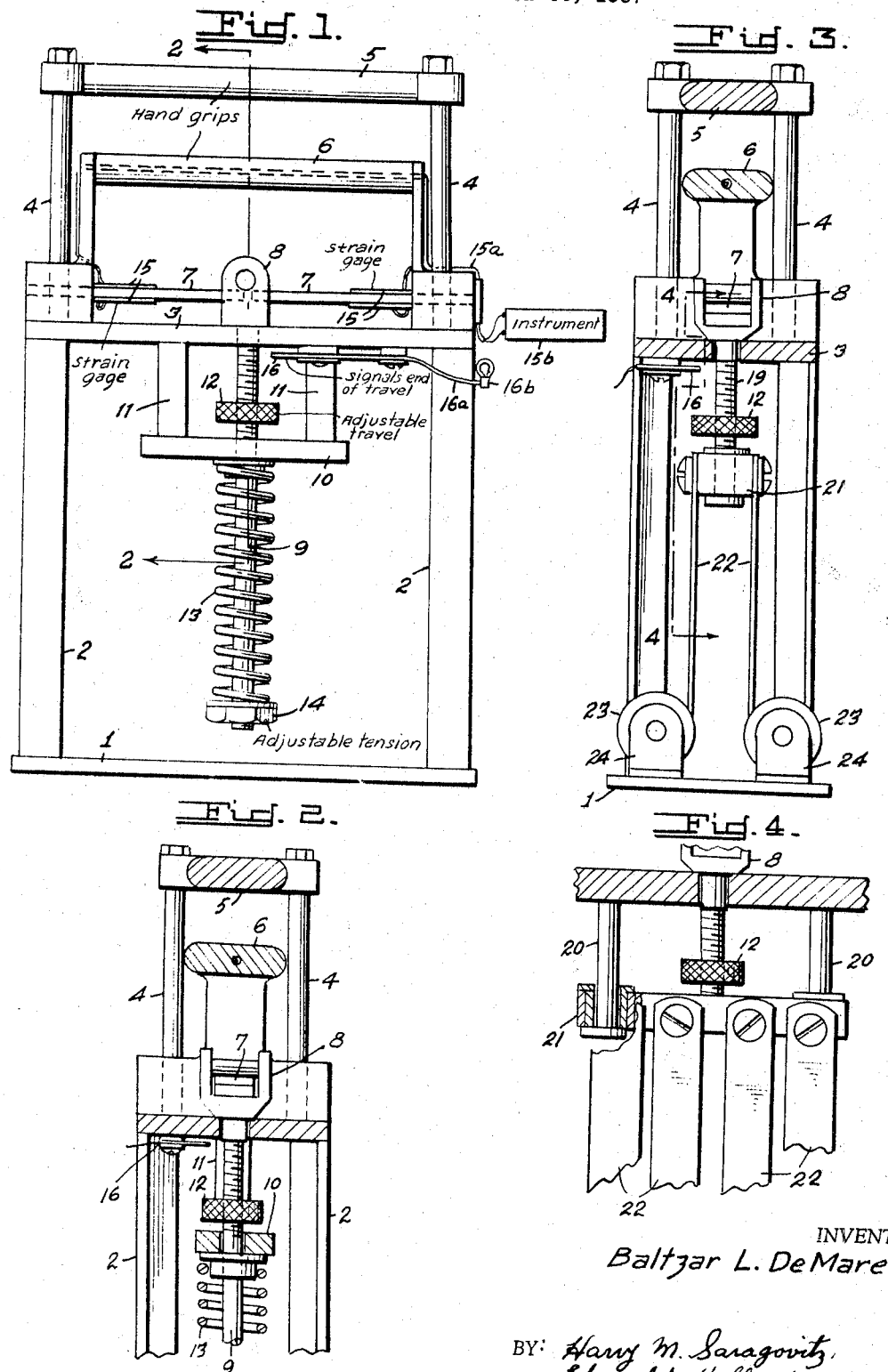

United States Patent Office 3,442,132
Patented May 6, 1969

3,442,132
ELECTRIC MYODYNAMOMETER
Baltzar Leo De Mare, Aberdeen, Md., assignor to the United States of America as represented by the Secretary of the Army
Filed Mar. 30, 1967, Ser. No. 627,598
Int. Cl. G01l 5/02
U.S. Cl. 73—379                    2 Claims

ABSTRACT OF THE DISCLOSURE

The apparatus is for use in determining muscular energy expended in doing work over a period of time. A handgrip, spring pressed to one position, may be repeatedly squeezed. An element is thereby repeatedly deformed. An electrical strain gage is used to detect the deformations and a recording instrument or electric meter may be used to indicate the changes in the electrical current passing through the strain gage during a period of time. The changes in current flow are proportional to force exerted and tend to show power produced as the person squeezes and releases the handgrip.

Specification

The invention described herein may be manufactured and used by or for the Government, for governmental purposes, without the payment to me of any royalty thereon.

Background

It is important to know what the ability of a person is to perform certain manual tasks repeatedly, such as grasping a lever, pressing a button, squeezing a trigger and so on. Apparatus is needed for measuring the magnitude, frequency and duration of muscular energy expended. Then fatigue rate, discomfort and effects on the rest of the human system may be noted and correlated with expenditure of energy.

Summary of the invention

The present invention is illustrated embodied in a handgrip type of device. A person grips a handle and squeezes a spring-biased element. The spring-biased element bends slightly. An electrical strain gage, associated with the element, is connected to an indicating or recording device to indicate the extent of bending of the element.

In the drawing:

FIG. 1 is a side elevation of the invention with parts in section;

FIG. 2 is a cross-sectional view along line 2—2 of FIG. 1;

FIG. 3 is a cross-sectional view through a modification;

FIG. 4 is a view along line 4—4 of FIG. 3.

The main frame consists of a base plate 1, upright members 2 and mounting plate 3. Columns 4 have an upper handle 5 attached thereto. A moveable lower handle 6 slides freely, guided by rods 4. Handle 6 has downward extensions to which cantilever beams 7 are attached. Clevis 8 forms a bifurcated end of pull rod 9 passing through plate 3 and a second plate 10 mounted on spacers 11. Stop nut 12 is threaded on rod 9 and graduations along the rod indicate the precise setting of the nut on the rod. Coil spring 13 is held by bottom nut 14, adjustable to vary compression on spring 13 to thereby vary the force required to compress the spring.

The cantilever beams 7 flex or bend slightly as a person grips handles 5 and 6 to squeeze them toward one-another. The amount of bending or flexing is proportional to the force exerted on handle 6 and is detected by pairs of well-known strain gages 15, bonded to the upper and lower surfaces of the cantilever beams 7. Leads 15a from gages 15 are connected to instrument 15b, such as the arms of a Wheatstone bridge, in a conventional manner as illustrated in Patent No. 3,150,450 issued to B. L. De Mare. Variations in the electrical output may be observed visually by use of an electrical meter, or may be recorded by an instrument connected to the Wheatstone bridge as illustrated in Patent No. 3,150,450.

Two gages 15 are preferably used, one on each side of the force producing spring. Thus the total force of pull will be indicated even if the force is unbalanced (by the strong index finger pulling harder than the weak little finger for example).

If the handles were squeezed completely together there would be no further bending or flexing of beams 7 and the instrument would not record any additional force exerted. Therefore, electrical contacts 16 are closed as nut 12 approaches the end of its movement and a signal 16b, connected to leads 16a, lets the person know he has moved the handle 6 to the end of its path.

In FIGS. 3 and 4 a constant-force myodynamometer comprises a short pull rod 19, crosshead 21, guide rods 20, and constant tension flat springs 22 wrapped on drums 23 and secured to base 1 by brackets 24.

What is claimed is:

1. A myodynamometer comprising a main frame, a first handle rigidly attached to said main frame, a second handle moveable with respect to said first handle, force producing means urging said second handle in one direction whereby a person may force it in the opposite direction against said means, indicating means associated with said second handle for indicating the degree of force applied to said second handle, said main frame comprising a base plate, upright members and a mounting plate, and columns on said mounting plate and supporting said first handle, said force producing means comprising spring means urging said second handle in said one direction, flexible means connecting said second handle to said force producing means, said spring means connected to the central area of said flexible means such that force applied to said second handle by a person's hand causes a deflection of said flexible means, said indicating means comprising a strain gage mounted on said flexible means.

2. A myodynamometer comprising a main frame, a first handle rigidly attached to said main frame, a second handle moveable with respect to said first handle, force producing means urging said second handle in one direction whereby a person may force it in the opposite direction against said means, indicating means associated with said second handle for indicating the degree of force applied to said second handle, flexible means connecting said second handle to said force producing means, said spring means connected to the central area of said flexible means such that force applied to said second handle by a person's hand causes a deflection of said flexible means, said indicating means comprising a pair of strain gages mounted on said flexible means, one on each side of said force producing means, such that the total force applied to said handle will be indicated even if the force is unbalanced with respect to said force producing means.

References Cited
UNITED STATES PATENTS
| | | | |
|---|---|---|---|
| 468,154 | 2/1892 | McClure | 73—380 |
| 689,652 | 12/1901 | Perry | 272—68 |
| 2,205,161 | 6/1940 | Vick | 272—68 |

FOREIGN PATENTS
| | | |
|---|---|---|
| 152,331 | 5/1962 | U.S.S.R. |

OTHER REFERENCES
Hunter Spring Co., Bulletin 663–5M–761P, Advance Bulletin # A310X.

RICHARD C. QUEISSER, *Primary Examiner.*

J. P. BEAUCHAMP, *Assistant Examiner.*

U.S. Cl. X.R.

272—68